US012148279B2

(12) United States Patent
Tsai et al.

(10) Patent No.: US 12,148,279 B2
(45) Date of Patent: Nov. 19, 2024

(54) SMOKE DETECTOR

(71) Applicant: PixArt Imaging Inc., Hsin-Chu (TW)

(72) Inventors: Cheng-Nan Tsai, Hsin-Chu (TW); Yen-Chang Chu, Hsin-Chu (TW); Chih-Ming Sun, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 253 days.

(21) Appl. No.: 17/883,625

(22) Filed: Aug. 9, 2022

(65) Prior Publication Data

US 2024/0054874 A1 Feb. 15, 2024

(51) Int. Cl.
*G08B 17/10* (2006.01)
*G08B 17/107* (2006.01)

(52) U.S. Cl.
CPC .................................. *G08B 17/107* (2013.01)

(58) Field of Classification Search
CPC .................................................... G08B 17/107
See application file for complete search history.

(56) References Cited

U.S. PATENT DOCUMENTS

| | | | | |
|---|---|---|---|---|
| 6,967,582 B2 * | 11/2005 | Tice | G08B 29/183 | 340/630 |
| 7,205,901 B2 * | 4/2007 | Demster | G08B 29/181 | 340/630 |
| 2002/0084907 A1 * | 7/2002 | Rattman | G08B 17/113 | 340/630 |
| 2002/0154018 A1 * | 10/2002 | Nishikawa | G08B 17/06 | 340/630 |
| 2005/0134468 A1 * | 6/2005 | Thomas | G08B 17/107 | 340/630 |
| 2006/0007010 A1 * | 1/2006 | Mi | G08B 29/20 | 340/630 |

* cited by examiner

*Primary Examiner* — Travis R Hunnings
(74) *Attorney, Agent, or Firm* — Winston Hsu

(57) ABSTRACT

A smoke detector includes a substrate, an optical detection module, a base and a top cover. The substrate has a ring shape region surrounding a central detection region, and a first block structure of the central detection region is protruded from the substrate and higher than an upper surface of the ring shape region. The optical detection module is disposed inside the central detection region. The base is disposed on the substrate and around the optical detection module. The base has a second block structure. The top cover is connected to the base. A lateral wall of the top cover is partly overlapped with the second block structure to form a guiding channel. The optical detection module analyzes variation of scattering parameters resulted from gaseous matter entering the top cover through the guiding channel for determining concentration of the gaseous matter.

14 Claims, 5 Drawing Sheets

SMOKE DETECTOR

BACKGROUND OF THE INVENTION

1. Field of the Invention

The present invention relates to a smoke detector, and more particularly, to a smoke detector with preferred smoke conductivity and preferred gaseous permeability.

2. Description of the Prior Art

A conventional optical smoke detection device includes a circuit board, an optical detector and a housing. The optical detector is disposed on the circuit board. The housing is installed on the circuit board to cover the optical detector. The conventional optical smoke detection device forms a plurality of holes on the housing. External gaseous matter flows into and out of the housing through the holes. The optical detector projects an optical signal onto the gaseous matter inside the housing, and detects variation of scattering parameters resulted from the illuminated gaseous matter to determine concentration of the gaseous matter. However, a detection accuracy of the optical detector is affected because ambient light easily enters the housing through the holes. One solution forms the holes on an end of the housing distant from the optical detector, but gaseous permeability of the housing is decreased so that the conventional optical smoke detection device cannot provide preferred detection accuracy. Another solution disposes a shelter around the housing, and the gaseous permeability of the housing is also decreased to level down the detection accuracy of the optical detector. Therefore, design of a smoke detector with preferred smoke conductivity and preferred gaseous permeability and without interference from the ambient light is an important issue in the mechanical design industry.

SUMMARY OF THE INVENTION

The present invention provides a smoke detector with preferred smoke conductivity and preferred gaseous permeability for solving above drawbacks.

According to the claimed invention, a smoke detector includes a substrate, an optical detection module, a base and a top cover. The substrate has a ring shape region surrounding a central detection region, and a first block structure of the central detection region is protruded from the substrate and higher than an upper surface of the ring shape region. The optical detection module is disposed inside the central detection region. The base is disposed on the substrate and around the optical detection module. The base has a second block structure. The top cover is connected to the base. A lateral wall of the top cover is partly overlapped with the second block structure to form a guiding channel. The optical detection module analyzes variation of scattering parameters resulted from gaseous matter entering the top cover through the guiding channel for determining concentration of the gaseous matter.

According to the claimed invention, the top cover includes the lateral wall and a cover body connected to each other. At least one of the lateral wall and the cover body has an airtight property.

According to the claimed invention, a dimming structure is disposed on an inner surface of the top cover.

According to the claimed invention, a top of the first block structure is higher than an upper surface of the optical detection module.

According to the claimed invention, the top of the first block structure is overlapped with the lateral wall of the top cover.

According to the claimed invention, the central detection region includes a sunken structure whereon inside the optical detection module is disposed.

According to the claimed invention, the ring shape region includes a plurality of grooves, and a top end of each groove is lower than a top of the first block structure.

According to the claimed invention, a dimming structure is disposed on an inner surface of the substrate adjacent to the guiding channel.

According to the claimed invention, a radial dimension of the lateral wall is smaller than a radial dimension of the second block structure.

According to the claimed invention, the base is integrated with the top cover monolithically.

According to the claimed invention, the smoke detector further includes a plurality of connection ribs, two opposite ends of each of the plurality of connection ribs are respectively connected to an inner surface of the base and an outer surface of the top cover.

According to the claimed invention, the optical detection module further includes an optical emitter and an optical receiver, the optical emitter emits an illumination beam toward inner of the top cover, the optical receiver receives and analyses the variation of scattering parameters resulted from the illumination beam projected onto the gaseous matter.

The present invention can utilize the substrate, the base and the top cover to form the case of the smoke detector. The optical detection module can be disposed on the central detection region of the substrate and surrounded by the first block structure. The second block structure of the base can be overlapped with the lateral wall of the top cover; the ambient light can be only projected onto the ring shape region of the substrate due to foresaid overlapping of the second block structure and the lateral wall, to avoid the optical detection module from being illuminated by the ambient light. The first block structure of the substrate can be optionally overlapped with the lateral wall of the top cover, so as to effectively prevent the ambient light from being reflected from the ring shape region to the optical detection module. The top cover of the smoke detector can have the airtight property, and the connection rib can be connected between the base and the top cover to form the openings of the guiding channel. The external gaseous matter can enter the top cover through one part of the guiding channel, and exhaust from the top cover through another part of the guiding channel. The smoke detector of the present invention can have the preferred smoke conductivity and the preferred gaseous permeability due to design of the guiding channel, and can allow smooth passing of the gaseous matter by the large-size guiding channel for the preferred detection accuracy and the preferred detection sensitivity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
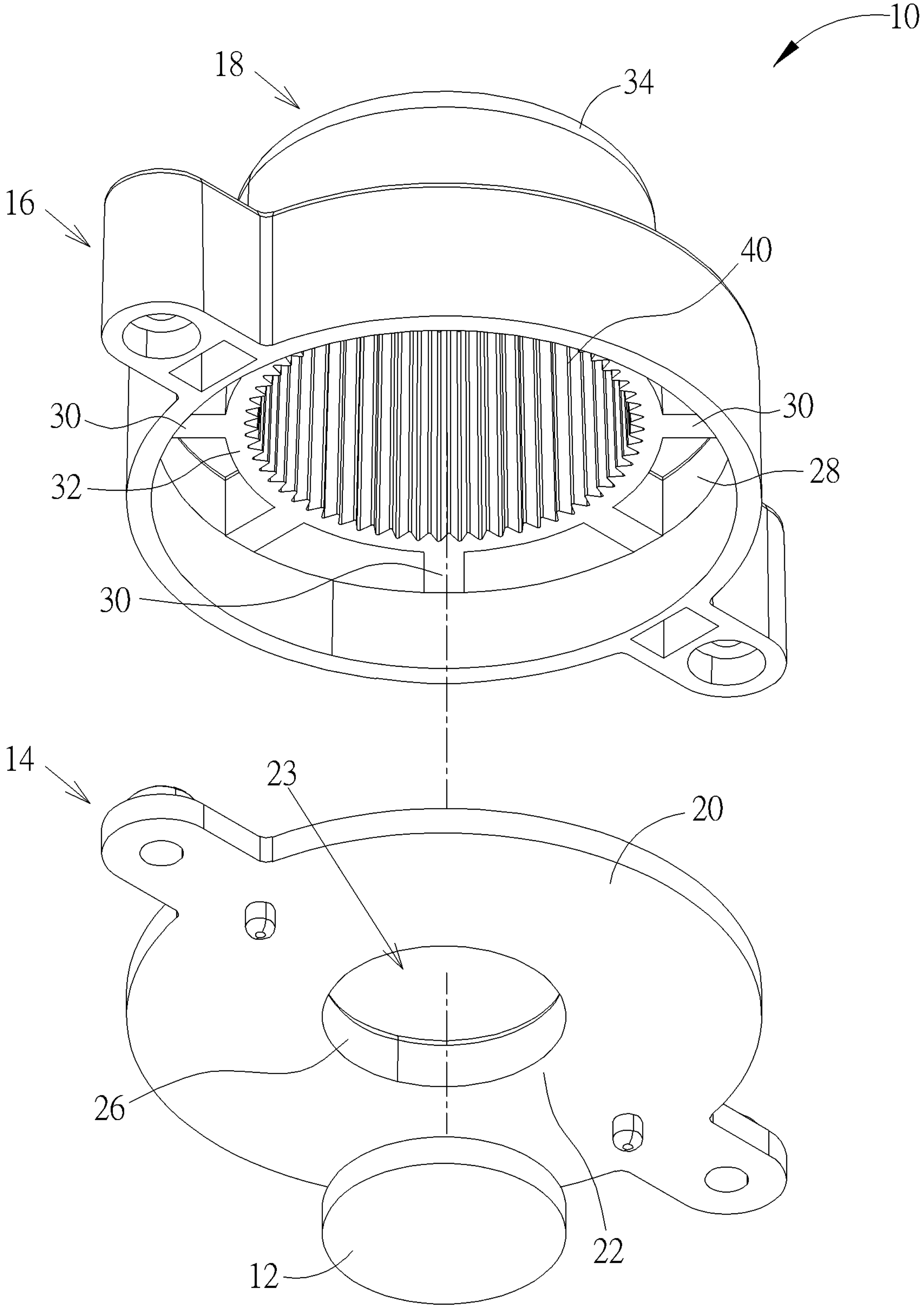
FIG. 1 is an exploded diagram of a smoke detector according to an embodiment of the present invention.
Figure 2:
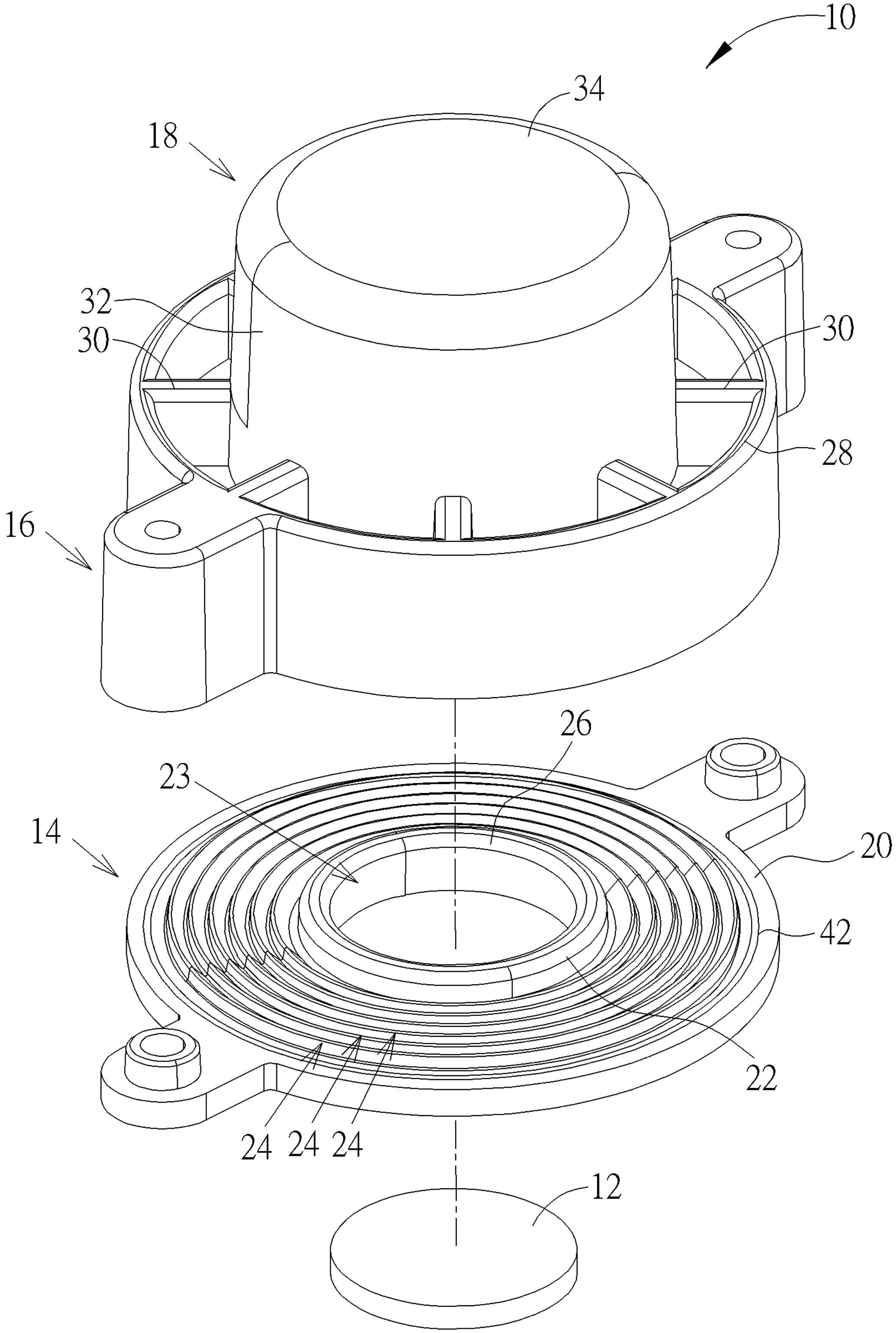
FIG. 2 is an exploded diagram of the smoke detector in another view according to the embodiment of the present invention.
Figure 3:
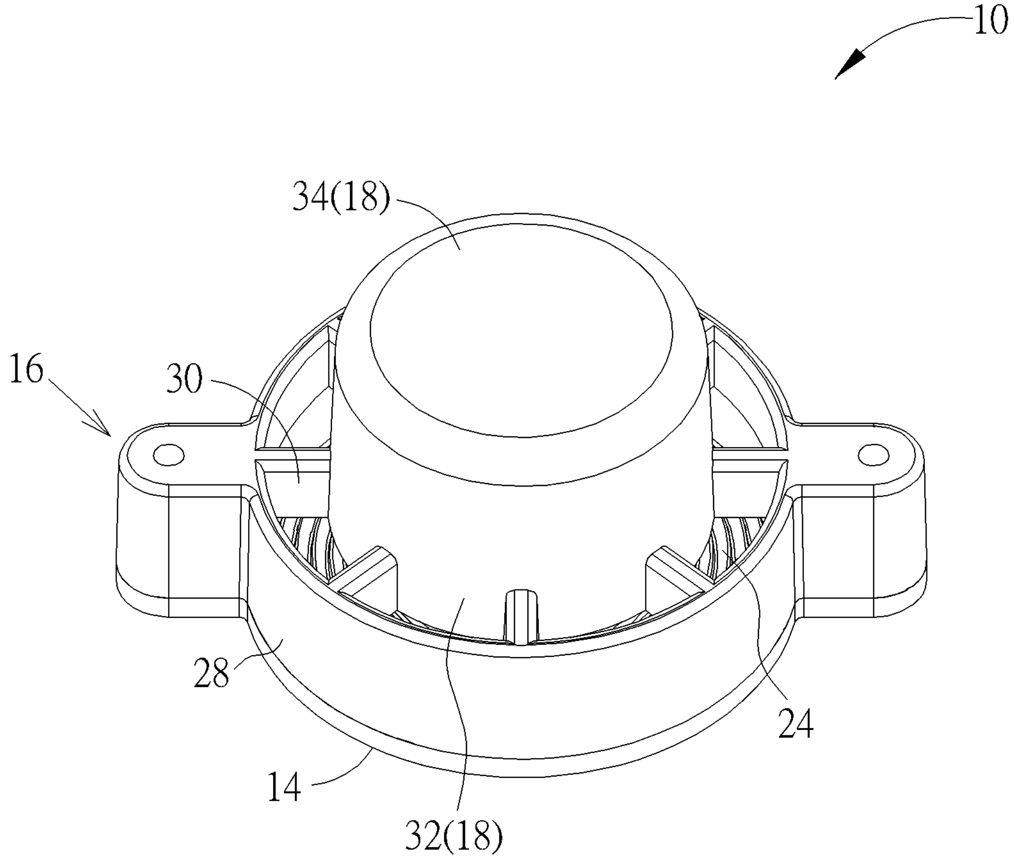
FIG. 3 is a diagram of the smoke detector according to the embodiment of the present invention.
Figure 4:
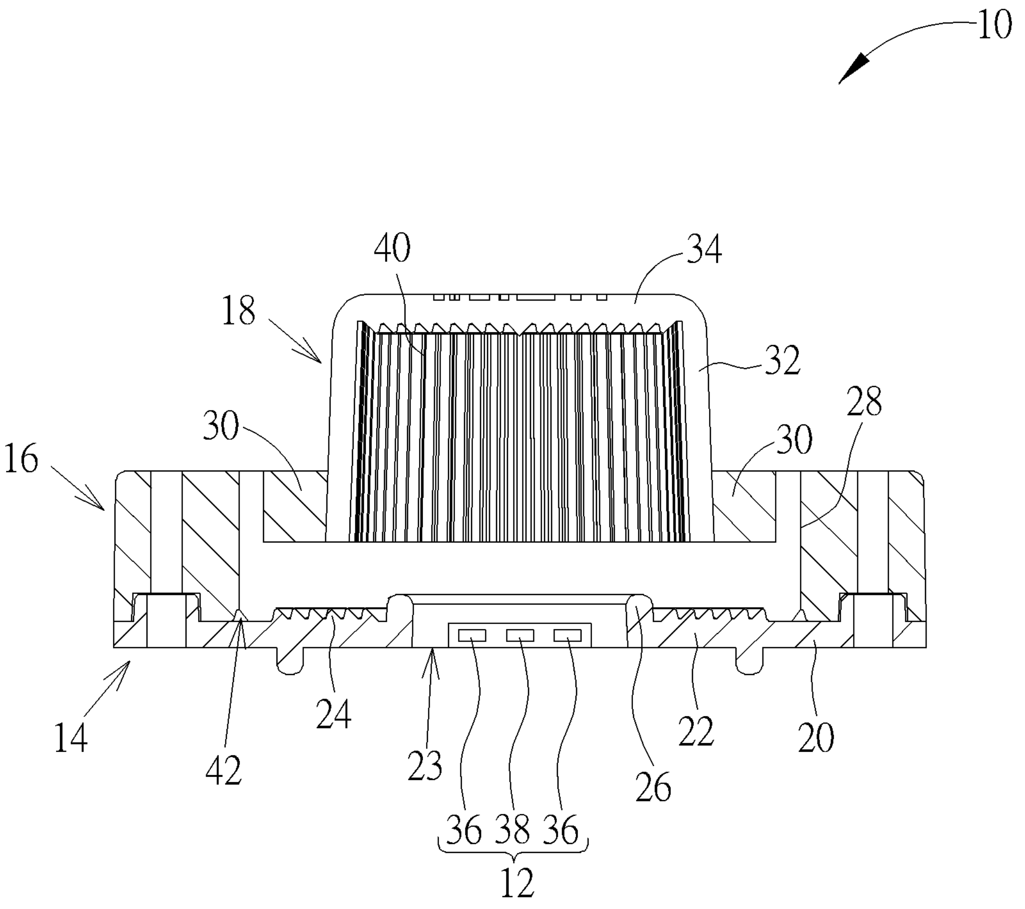
FIG. 4 is a sectional view of the smoke detector according to the embodiment of the present invention.
Figure 5:
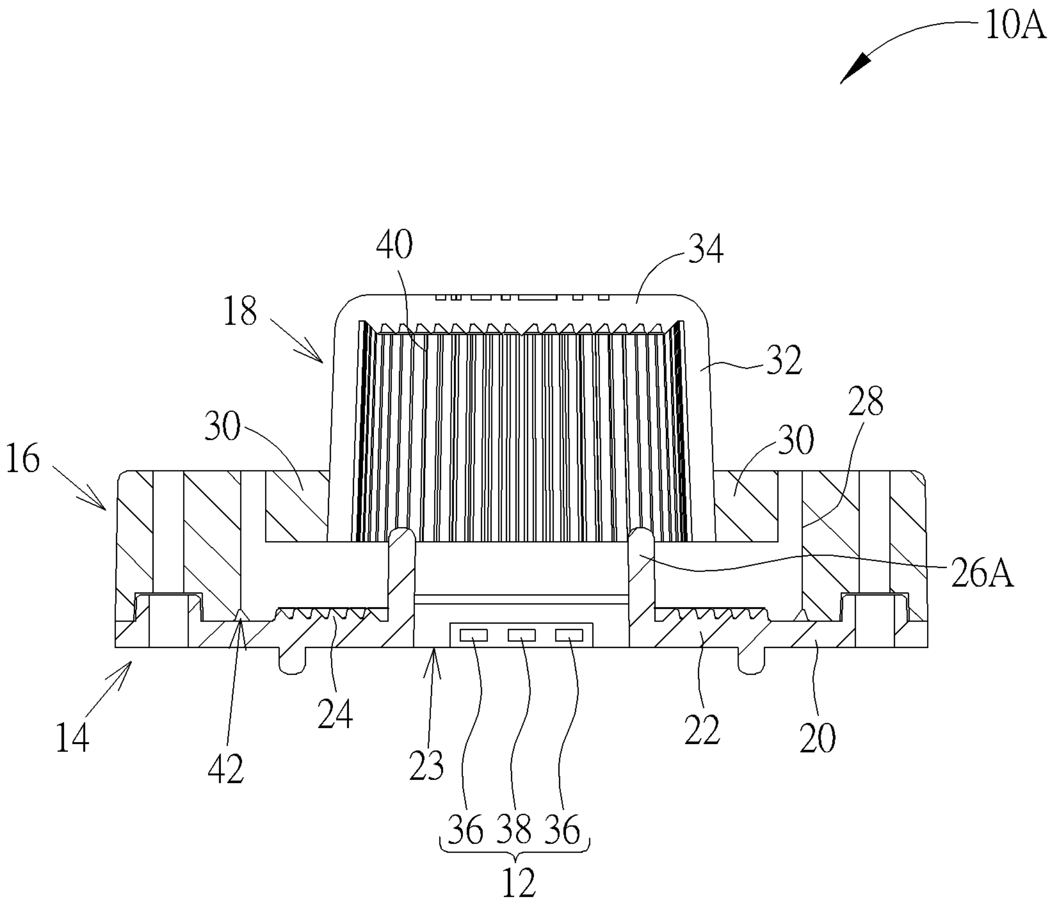
FIG. 5 is a sectional view of the smoke detector according to another embodiment of the present invention.

Please refer to FIG. 1 to FIG. 5. FIG. 1 and FIG. 2 are exploded diagrams of a smoke detector 10 in different views according to an embodiment of the present invention. FIG. 3 is a diagram of the smoke detector 10 according to the embodiment of the present invention. FIG. 4 is a sectional view of the smoke detector 10 according to the embodiment of the present invention. FIG. 5 is a sectional view of the smoke detector 10A according to another embodiment of the present invention. The smoke detector 10 can include an optical detection module 12, a substrate 14, a base 16 and a top cover 18. The optical detection module 12 can analyze variation of scattering parameters to determine concentration of gaseous matter entering through the smoke detector 10. The optical detection module 12 can be disposed inside a case of the smoke detector 10. The case of the present invention can have advantages of high smoke conductivity and high gaseous permeability for effectively restraining interference of ambient light, so as to prevent a detection accuracy of the optical detection module 12 from being affected by variation of the ambient light.

The case can include a substrate 14, a base 16 and a top cover 18. The substrate 14 can have a ring shape region 20 and a central detection region 22. The central detection region 22 is a place where on the optical detection module 12 is disposed. The central detection region 22 can be a hollow element; the smoke detector 10 may be installed on a circuit board (which is not shown in the figures), and the optical detection module 12 can pierce through the central detection region 22 to directly dispose on the circuit board. Besides, the central detection region 22 may be a solid element (which is not shown in the figures), and the optical detection module 12 can be directly disposed on the central detection region 22. A type of the central detection region 22 is not limited to the embodiment shown in FIGS. 1 to 4, and depends on a design demand. In addition, the central detection region 22 can have a sunken structure 23, and the sunken structure 23 can be a hole of the hollow element or a center of the solid element. The optical detection module 12 can be disposed inside the sunken structure 23.

The ring shape region 20 can be disposed around the central detection region 22. The ring shape region 20 can have a plurality of grooves 24, and each of the plurality of grooves 24 can surround the central detection region 22 as a concentric circle. A width, a depth and a shape of the groove 24 are not limited to the embodiment shown in FIGS. 1 to 4, which depend on the design demand. The central detection region 22 can include a first block structure 26 protruded from the substrate 14. A top of the first block structure 26 can be higher than an upper surface of the optical detection module 12 to avoid the interference of the ambient light. Besides, the top of the first block structure 26 can be higher than an upper surface 201 of the ring shape region 20 and a top end of the groove 24. The top end of the groove 24 can be higher than the upper surface 201 of the ring shape region 20, and a bottom end of the groove 24 can be lower than the upper surface 201 of the ring shape region 20.

The base 16 can be disposed on the substrate 14 to surround and cover the optical detection module 12, so as to provide a protection function and artistic decoration. The base 16 can have a second block structure 28 disposed on the substrate 14 as a ring. The second block structure 28 can be spaced from the top cover 18. The smoke detector 10 can further include a plurality of connection ribs 30. Two opposite ends of each connection rib 30 can be respectively connected to the inner surface of the base 16 (which means an inner lateral surface of the second block structure 28) and an outer surface of the top cover 18, and a plurality of openings can be formed between the substrate 14 and the base 16. Therefore, the top cover 18 can be connected to the second block structure 28 via the connection ribs 30. The smoke detector 10 can utilize the lateral wall 32 of the top cover 18, the second block structure 28 of the base 16, and the connection rib 30 to form a guiding channel composed of the plurality of openings. It should be mentioned that the lateral wall 32 can be partly overlapped with the second block structure 28, as shown in FIG. 4; a bottom of the lateral wall 32 can be lower than a top of the second block structure 28, or the top cover 18 can be partly inserted into the second block structure 28 of the base 16.

The top cover 18 can include a lateral wall 32 and a cover body 34 connected to each other. The lateral wall 32 and the cover body 34 can have an airtight property; the airtight property can be interpreted as the top cover 18 having no piercing holes and the top cover 18 being made by airtight material. The gaseous matter entering the smoke detector 10 through the guiding channel can be gathered inside the top cover 18, and be detected by the optical detection module 12 and then exhausted from the smoke detector 10 through the guiding channel. The base 16, the top cover 18 and the connection rib 30 can be independent elements assembled with each other in a detachable manner; besides, the base 16 may be integrated with the top cover 18 and the connection rib 30 monolithically. The optical detection module 12 can include an optical emitter 36 and an optical receiver 38. Numbers and positions of the optical emitter 36 and the optical receiver 38 are not limited to the embodiment shown in FIG. 4, and depend on the design demand. The optical emitter 36 can emit an illumination beam into the top cover 18. The illumination beam can be projected onto the gaseous matter inside the top cover 18 to result in a scattering phenomenon. The optical receiver 38 can receive and analyze the variation of the scattering parameters resulted from the gaseous matter, so as to determine the concentration of the gaseous matter around the smoke detector 10.

The lateral wall 32 of the top cover 18 can be partly overlapped with the second block structure 28 of the base 16, for preventing the ambient light from directly projecting onto the optical receiver 38, so that the smoke detector 10 can have the preferred detection accuracy of the optical detection module 12. Overlap between the lateral wall 32 and the second block structure 28 can be interpreted as a planar normal vector of the lateral wall 32 is substantially parallel to a planar normal vector of the second block structure 28, and the lateral wall 32 is partly located inside an inner space surrounded by the second block structure 28. The top of the first block structure 26 can be optionally lower than the lateral wall 32 of the top cover 18, which means the top of the first block structure 26 can be near to substrate 14, and the gaseous matter can smoothly flow into the top cover 18 through the guiding channel between the base 16 and the top cover 18 and further between the substrate 14 and the top cover 18, as the embodiment shown in FIG. 4. Further, as the embodiment shown in FIG. 5, the smoke detector 10A can design that the top of the first block structure 26A is optionally overlapped with the lateral wall 32 of the top cover 18, overlap between the first block structure 26A and the lateral wall 32 can be interpreted as a planar normal vector of the first block structure 26A is substantially parallel to the planar normal vector of the lateral wall 32, and the first block structure 26A is partly located inside an inner space surrounded by the lateral wall 32; in this embodiment, the top of the first block structure 26A can be lengthened to partly insert into the top cover 18, or the bottom of the lateral wall 32 can be lengthened to overlap with the first block structure 26A, or the top of the first block structure 26A and the bottom of the lateral wall 32 can be lengthened and overlapped. Structural design of the first block structure 26A overlapped with the lateral wall 32 can be used to block a possible transmission path of the ambient light, so as to decrease the interference of the ambient light and increase the detection accuracy of the optical detection module 12 accordingly.

As the embodiments shown in FIG. 4 and FIG. 5, a radial dimension of the lateral wall 32 can be smaller than a radial dimension of the second block structure 28, and a radial dimension of the first block structure 26 can be smaller than the radial dimension of the lateral wall 32. Difference between the foresaid radial dimensions can be a caliber of the guiding channel, and an actual value of the caliber can depend on the design demand, and a detailed description is omitted herein for simplicity. Moreover, the smoke detector 10 (or the smoke detector 10A) can dispose a dimming structure 40 on a surface of the top cover 18, and further dispose a dimming structure 42 on an inner surface (such as the ring shape region 20) of the substrate 14 adjacent to the guiding channel. The dimming structure 40 and the dimming structure 42 can decrease reflection intensity of the illumination beam between the substrate 14 and the top cover 18, so as to increase the detection sensitivity of the optical detection module 12. The dimming structure 40 and the dimming structure 42 may be made by specific material or be composed of specific structural design. Features of the dimming structure 40 can be the same as or similar to features of the dimming structure 42, and the detailed description is omitted herein for simplicity.

In conclusion, the present invention can utilize the substrate, the base and the top cover to form the case of the smoke detector. The optical detection module can be disposed on the central detection region of the substrate and surrounded by the first block structure. The second block structure of the base can be overlapped with the lateral wall of the top cover; the ambient light can be only projected onto the ring shape region of the substrate due to foresaid overlapping of the second block structure and the lateral wall, to avoid the optical detection module from being illuminated by the ambient light. The first block structure of the substrate can be optionally overlapped with the lateral wall of the top cover, so as to effectively prevent the ambient light from being reflected from the ring shape region to the optical detection module. The top cover of the smoke detector can have the airtight property, and the connection rib can be connected between the base and the top cover to form the openings of the guiding channel. The external gaseous matter can enter the top cover through one part of the guiding channel, and exhaust from the top cover through another part of the guiding channel. The smoke detector of the present invention can have the preferred smoke conductivity and the preferred gaseous permeability due to design of the guiding channel, and can allow smooth passing of the gaseous matter by the large-size guiding channel for the preferred detection accuracy and the preferred detection sensitivity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A smoke detector, comprising:

a substrate having a ring shape region surrounding a central detection region, and a first block structure of the central detection region being protruded from the substrate and higher than an upper surface of the ring shape region;

an optical detection module disposed inside the central detection region;

a base disposed on the substrate and around the optical detection module, the base having a second block structure; and a top cover connected to the base, a lateral wall of the top cover being partly overlapped with the second block structure to form a guiding channel, the optical detection module analyzing variation of scattering parameters resulted from gaseous matter entering the top cover through the guiding channel for determining concentration of the gaseous matter;

wherein the top cover comprises the lateral wall and a cover body connected to each other, at least one of the lateral wall and the cover body has an airtight property.

2. The smoke detector of claim 1, wherein a dimming structure is disposed on an inner surface of the top cover.

3. The smoke detector of claim 1, wherein a top of the first block structure is higher than an upper surface of the optical detection module.

4. The smoke detector of claim 3, wherein the top of the first block structure is overlapped with the lateral wall of the top cover.

5. The smoke detector of claim 1, wherein the central detection region comprises a sunken structure whereon inside the optical detection module is disposed.

6. The smoke detector of claim 1, wherein the ring shape region comprises a plurality of grooves, and a top end of each groove is lower than a top of the first block structure.

7. The smoke detector of claim 1, wherein a dimming structure is disposed on an inner surface of the substrate adjacent to the guiding channel.

8. The smoke detector of claim 1, wherein a radial dimension of the lateral wall is smaller than a radial dimension of the second block structure.

9. The smoke detector of claim 1, wherein the base is integrated with the top cover monolithically.

10. The smoke detector of claim 1, wherein the smoke detector further comprises a plurality of connection ribs, two opposite ends of each of the plurality of connection ribs are respectively connected to an inner surface of the base and an outer surface of the top cover.

11. The smoke detector of claim 1, wherein the optical detection module further comprises an optical emitter and an optical receiver, the optical emitter emits an illumination beam toward inner of the top cover, the optical receiver receives and analyses the variation of scattering parameters resulted from the illumination beam projected onto the gaseous matter.

12. A smoke detector, comprising:
- a substrate having a ring shape region surrounding a central detection region, and a first block structure of the central detection region being protruded from the substrate and higher than an upper surface of the ring shape region, the ring shape region comprising a plurality of grooves, and a top end of each groove being lower than a top of the first block structure;
- an optical detection module disposed inside the central detection region;
- a base disposed on the substrate and around the optical detection module, the base having a second block structure; and
- a top cover connected to the base, a lateral wall of the top cover being partly overlapped with the second block structure to form a guiding channel, the optical detection module analyzing variation of scattering parameters resulted from gaseous matter entering the top cover through the guiding channel for determining concentration of the gaseous matter.

13. A smoke detector, comprising:
- a substrate having a ring shape region surrounding a central detection region, and a first block structure of the central detection region being protruded from the substrate and higher than an upper surface of the ring shape region;
- an optical detection module disposed inside the central detection region;
- a base disposed on the substrate and around the optical detection module, the base having a second block structure;
- a top cover connected to the base, a lateral wall of the top cover being partly overlapped with the second block structure to form a guiding channel, the optical detection module analyzing variation of scattering parameters resulted from gaseous matter entering the top cover through the guiding channel for determining concentration of the gaseous matter; and
- a plurality of connection ribs, two opposite ends of each of the plurality of connection ribs being respectively connected to an inner surface of the base and an outer surface of the top cover.

14. A smoke detector, comprising:
- a substrate having a ring shape region surrounding a central detection region, and a first block structure of the central detection region being protruded from the substrate and higher than an upper surface of the ring shape region;
- an optical detection module disposed inside the central detection region;
- a base disposed on the substrate and around the optical detection module, the base having a second block structure; and
- a top cover connected to the base, a lateral wall of the top cover being partly overlapped with the second block structure to form a guiding channel, the optical detection module analyzing variation of scattering parameters resulted from gaseous matter entering the top cover through the guiding channel for determining concentration of the gaseous matter, a dimming structure being disposed on at least one of an inner surface of the top cover and an inner surface of the substrate adjacent to the guiding channel.

* * * * *